March 29, 1938.   B. BROWNE   2,112,516
METERING DEVICE
Filed Nov. 6, 1936
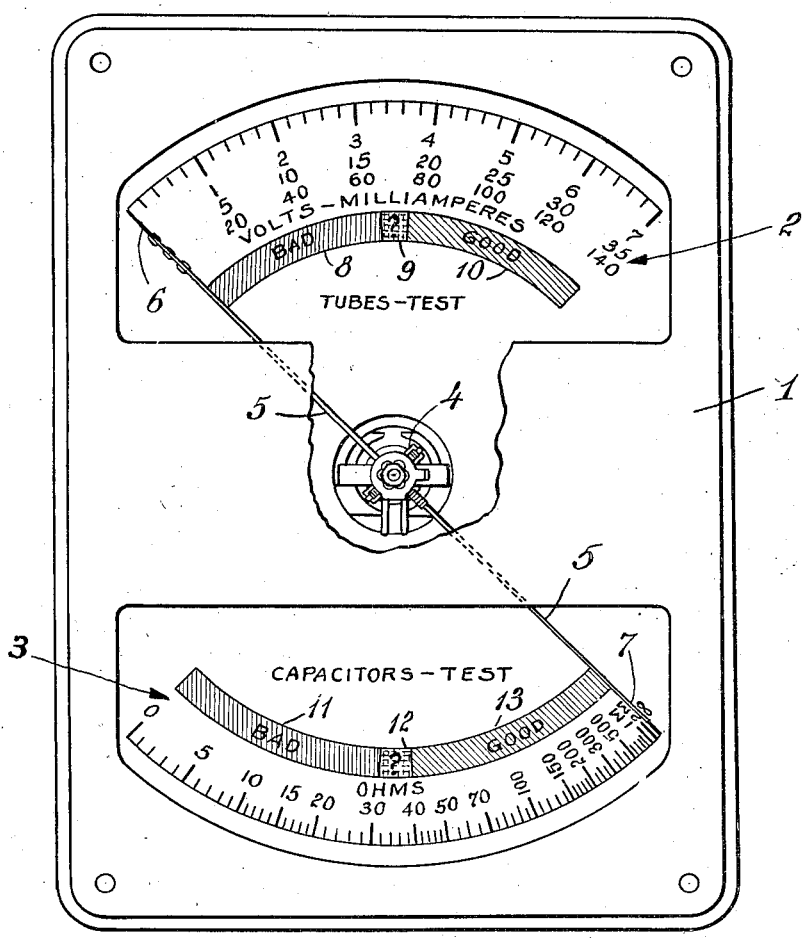
INVENTOR
Burton Browne
BY
Pennie, Davis, Marvin and Edmonds.
ATTORNEYS Patented Mar. 29, 1938

2,112,516

UNITED STATES PATENT OFFICE 2,112,516

METERING DEVICE

Burton Browne, Chicago, Ill., assignor to Supreme Instruments Corporation

Application November 6, 1936, Serial No. 109,463

4 Claims. (Cl. 171—95)

This invention relates to metering devices, and particularly to electric indicating meters having scales of inverse quantities as well as scales of direct quantities.

The chief object of the invention is to expedite and facilitate the correct and precise reading of such meters by removing certain sources of error and confusion, and to do so in particular by giving to all the scales of such meters a uniformity of construction which permits them to be read by a single standardized procedure, independent of whether they are scales of direct or of inverse quantities.

To this end, I divide the scales normally present in such meters into two groups. The scales in the first group are preferably limited to direct quantities, and in the second group are scales of all inverse quantities which the meter is adapted to indicate. To the usual, single actuating element of the meter is attached, at or near its center, a double-pointed indicating needle, the scale groups being so placed with respect to the needle that one end thereof sweeps over the first scale group and indicates values of direct quantities while the opposite end sweeps over the second scale group and indicates values of inverse quantities.

One type of multi-scale indicating meter to which the invention is especially applicable is the combination ammeter-voltmeter-ohmmeter which is indispensible in the radio factory or service shop of the present day, and which with its associated apparatus, is commonly known as a circuit tester or analyzer. This meter is essentially a galvanometer actuated by a D'Arsonval movement, which, as is well-known, is current-operated, having a plurality of scales and an arrangement of multiplying resistors and shunts which may be switched in or out of the circuit for the measurement of currents and voltages of various ranges. For the measurement of resistance, an electromotive force of known magnitude is connected in series with the sensitive element of the meter and with the unknown resistor. The current which flows will under these circumstances be inversely proportional to the value of the resistance of the circuit.

Since current through and voltage across an electric circuit are proportional to each other, it is possible to employ the same divisions and numerals for current and voltage scales. Careful design and manufacture of the mechanism results in substantially perfect proportionality between current and needle deflection, and this makes possible the use of scales whose divisions are equally spaced or substantially so. It is the universal practice to place such scales with the zeros at the left and numerals increasing to the right in the natural manner to which persons of occidental education are accustomed. Such scales can be read with ease, rapidity and precision.

It is otherwise with the resistance or ohm scale, because the current which produces the needle deflection is inversely proportional to the resistance. The larger numbers, representing high resistance, (in the absence of the present invention) must therefore be marked near the left hand end of the scale where needle deflections are small, and small numbers representing low resistance, must be marked near the right hand end of the scale where needle deflections are large. Likewise the extreme left hand division which is marked "Zero" (0) on the current and voltage scales must be marked "Infinity" ($\infty$) on the resistance scale. Due to the reciprocal relation between current and resistance, when voltage is constant, the divisions of the scale of ohms are unequally spaced, and do not, in general, coincide with those of the current and voltage scales.

A meter of this single-dial multi-scale type is shown in one of its better-known embodiments in U. S. Patent No. 2,046,450. A dial bearing scales as above described and as shown in that patent, is subject to several serious objections. The numerals of the ohm scale increase from right to left in an unnatural manner, and this alone is a source of confusion in reading the meter. Further, when, as is usually the case, the needle point lies between two numbered divisions, the unnumbered divisions and fractions of a division must be counted from right to left. Considerable time and attention are required and consumed in the precise reading of such a scale. A further source of confusion and possible resulting error exists in the usual placement close together of two such dissimilar scales as the ohm scale and any one of the current or voltage scales.

Referring now to the drawing, there is illustrated a volt-ampere-ohm meter constructed in accordance with a preferred form of my invention. The face 1 of the instrument is provided with a dial or dials bearing two scale groups 2, 3, oppositely placed with respect to the center. The moving element 4, actuating an index comprising a double-pointed needle 5, is mounted immediately beneath the center of the face of the instrument, in such fashion that one point 6 may swing over the upper scale group 2 and the other point 1 may swing over the lower scale group 3. The upper scale group comprises scales of volts and milliamperes. The same divisions serve for all these scales, all the zeros being placed at the left ends thereof. Thus the numerals all increase to the right in the natural manner.

The lower scale group 3 comprises a scale of ohms. Its numerals also increase to the right, the last division being marked "Infinity" (∞). The scale of ohms is so marked and divided that diametrically opposite divisions on the ohm and ampere scales are inversely proportional to each other. The rest position of the moving element is such that the needle lies diagonally across the face of the instrument, from the "zeros" of current and voltage to the "infinity" of resistance. In addition to the scales of numerals and divisions, the face of the instrument bears "good", "bad" and "doubtful" (?) zones, which will be described hereinafter.

In this preferred form, the needle is shown attached at its center. This central attachment is of course not an essential feature of the invention, it being necessary only that there be some extension of the needle on either side of its point of support and that the needle be sufficiently balanced. Therefore, when in the present specification and claims the central attachment of the needle is referred to, it should be understood to include any construction whereby two points of a needle, whatever may be their relative lengths, are free to move in the same angular, but in opposite translatory, directions, as the actuating element moves.

It will thus be seen that many advantages result from this novel construction, among which are the following: (1) The fact that the ohm scale may be read from left to right in the natural manner eliminates one source of possible error in reading, especially in the usual case when the needle lies between two numbered divisions. (2) A further source of possible error and confusion is eliminated and much time in reading is saved by the fact that this uniformity of arrangement of all scales permits the operator to employ a single standardized procedure in reading all the scales, independent of whether they are scales of direct or of inverse quantities and without regard to the dial on which they appear. (3) The removal of the ohm scale from proximity with the ampere and volt scales greatly reduces the importance of such unavoidable dissimilarities as remain between them, in respect of unequalness of division of the ohm scale. (4) These remaining dissimilarities may be still further reduced in their effect by providing, in the case of artificially illuminated dials, separate illumination for the upper and lower scale groups. Control of such illumination may be automatically effected by the same switch or knob which determines the scale in use. Any appropriate method of illuminating the dial may be used, as by locating lamps above the dial if it be opaque, or beneath the dial if it be translucent.

In some meters, it is desirable to have acceptance or "good" zones and rejection or "bad" zones either in addition to or in place of given portions of a scale. This practice has been found especially advantageous both in the routine testing of factory products and in determining whether certain standard parts have deteriorated in use. Such zones are customarily made of different colors; for example, the "good" zone may be colored green and the "bad" zone red, and a zone in between, indicating "doubtful" (?) may be colored yellow. For maximum benefit, each zone should be so large that a minimum of attention is required of the operator in order to determine with ease and accuracy in which zone the indicating needle lies. Evidently the advantage residing in the provision of such zones over a scale of numerals is greatly reduced if two or more groups of such zones, indicating good and bad examples of two different products, are in proximity with one another on a dial.

Two components which are particularly subject to deterioration, and for the testing of which zones are most frequently provided, are vacuum tubes and capacitors or condensers, such as are employed in radio apparatus. The performance or degree of excellence of the vacuum tube is measured by its plate current and that of the capacitor by its leakage resistance. In the case of good components, the tube current and the capacitor resistance are both high, and in the case of bad components, they are both low. The inclusion of "good" and "bad" zones for both vacuum tubes and capacitors in the single scale group of the testing meters as heretofore used is therefore especially confusing because in addition to the requirement of two pairs of zones in the same group, it is required that the left hand side of the dial bear both a "good" and a "bad" zone and the right hand side a "bad" and a "good" one, all in close proximity.

Thus this invention results in a further advantage in so far as both of these difficulties are wholly eliminated. Not only are the zones 8, 9, 10, for use in testing tubes, completely separated from the zones 11, 12, 13, for testing capacitors, but also the "bad" zones 8, 11 are both at the left hand side of the dial, the "good" zones 10, 13 at the right hand side, and the "doubtful" (?) zones 9, 12, at the center. This improvement is evident from the drawing.

From the foregoing description of the present invention in its embodiment in an indicating meter having scales of volts, amperes, and ohms, and subordinately, zones for the testing of tubes and capacitors, it is not to be inferred that ohmic resistance is the only possible inverse electrical quantity. If the meter-actuating element be responsive to alternating current, both reactance and impedance may be measured on the ohm scale. If a standard voltage and frequency be employed, a scale of henries may be added for the measurement of inductance. This should of course be placed on the lower scale group, because inductance is a quantity inverse to current. It is contemplated further that for some purposes scales may be desired which are inverse to current in a broader sense than that hitherto employed in this specification; for example, a scale of attenuation, reading in decibels. In that case, the numerals will be logarithmically related to the current flowing through the moving element, rather than reciprocally as are the divisions on the ohm scale. They will, however, increase as the current decreases and should preferably be placed, in accordance with this invention, on the lower or inverse scale group. Other examples of electrical quantities which are inverse to current in this broader sense will now be apparent, as will the proper separation and combination of the appropriate scales.

The simplest form of the present invention obviously comprises a meter having a dial with two separate visible portions and a double-pointed indicating needle, but it is equally applicable to other forms of construction, such, for example, as a meter having a pivoted drum dial actuated by the moving element, opposite portions of the periphery of the drum dial being viewed through windows oppositely located in the wall of the meter case. The portion viewed through one such window may bear scales of direct quantities, and the opposite portion, scales of inverse quantities, each of which is designated by a separate stationary index secured to the case. Still other variations of mechanical construction and form within the scope of my invention will suggest themselves to those skilled in the art.

Having now described my invention, I claim:

1. In an indicating instrument of the D'Arsonval type having a moving coil and stationary pole pieces, a scale having substantially equally spaced graduations for one electrical quantity, a second scale of unequally spaced graduations for an electrical quantity which is a reciprocal of the electrical quantity for which the first scale is graduated, said second scale being spaced relatively far from said first scale, the graduations of both scales all increasing from left to right throughout the full length of the scales, separate indices mechanically fixed together and cooperating with said scales, and means actuated by passage of electric current through said coil for causing relative movement between the said scales and indices.

2. A meter for indicating direct and inverse quantities of an electric-current-carrying circuit, having a double-ended indicating needle attached at a central portion thereof to an actuating element of the meter, a first scale group including scales of amperes and volts in which the numerals increase in one direction, a second scale group including a scale of ohms having numerals increasing in the same direction, said groups being so spaced in relation to said indicating needle that actuation of said actuating element sweeps one end of said needle over one of said scale groups and simultaneously sweeps the other end of said needle over the other of said scale groups.

3. In an electric instrument having a current-responsive actuating element and a face provided with zones for visually indicating acceptance or rejection of two different types of electric apparatus in terms of the amount of electric current flowing therethrough, said first type including only apparatus of which the degree of excellence is indicated by a relatively large current flowing therethrough, said second type including only apparatus of which the degree of excellence is indicated by a relatively small current flowing therethrough, the combination of a double-ended indicating needle attached at its central portion to said element, with diametrically opposite scale portions on the face of the instrument, said face having right and left sides, each scale portion consisting of separate zones marked in a distinctive manner designating acceptance and rejection respectively, of only one of said two types of apparatus, each scale portion cooperating with a different end of said needle, said acceptance zones of both scale portions being located near one of said sides, and said rejection zones of both scale portions being located near the other of said sides.

4. In an electric instrument having a current-responsive actuating element and dial zones for visually indicating acceptance or rejection of two different types of electric apparatus in terms of the amount of electric current flowing therethrough, said first type including only apparatus of which the degree of excellence is indicated by a relatively large current flowing therethrough, and said second type including only apparatus of which the degree of excellence is indicated by a relatively small current flowing therethrough; the combination of two scale portions located on opposite sides of a dial, each of said scale portions having separate zones marked in a distinctive manner to designate acceptance and rejection with respect to one of said two types of apparatus, with two separate indices mechanically fixed together and relatively movable with respect to said scale portions, one of said indices cooperating with one of said scale portions and the other of said indices cooperating with the other of said scale portions, both of said acceptance zones being located on one side of an imaginary plane passing through both of said scale portions, and both of said rejection zones being located on the other side of said plane.

BURTON BROWNE.